March 24, 1964  C. F. TRAVIS ETAL  3,126,080
COUPLING AND DECOUPING DRIVE UNIT
Filed Oct. 10, 1960  2 Sheets-Sheet 1
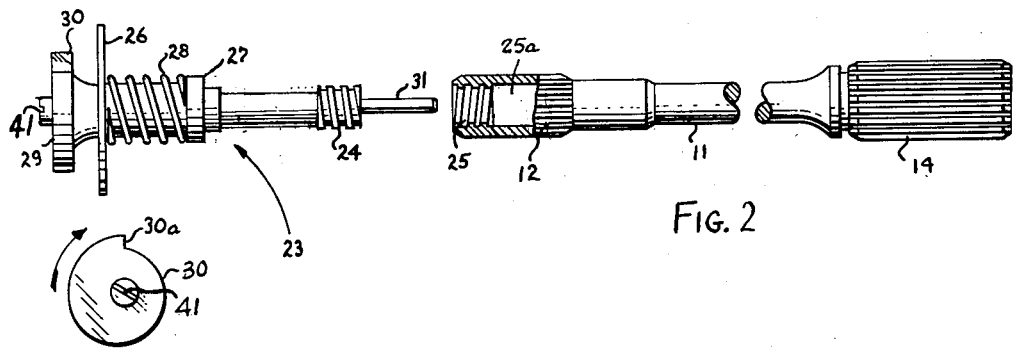
FIG. 2
FIG. 3
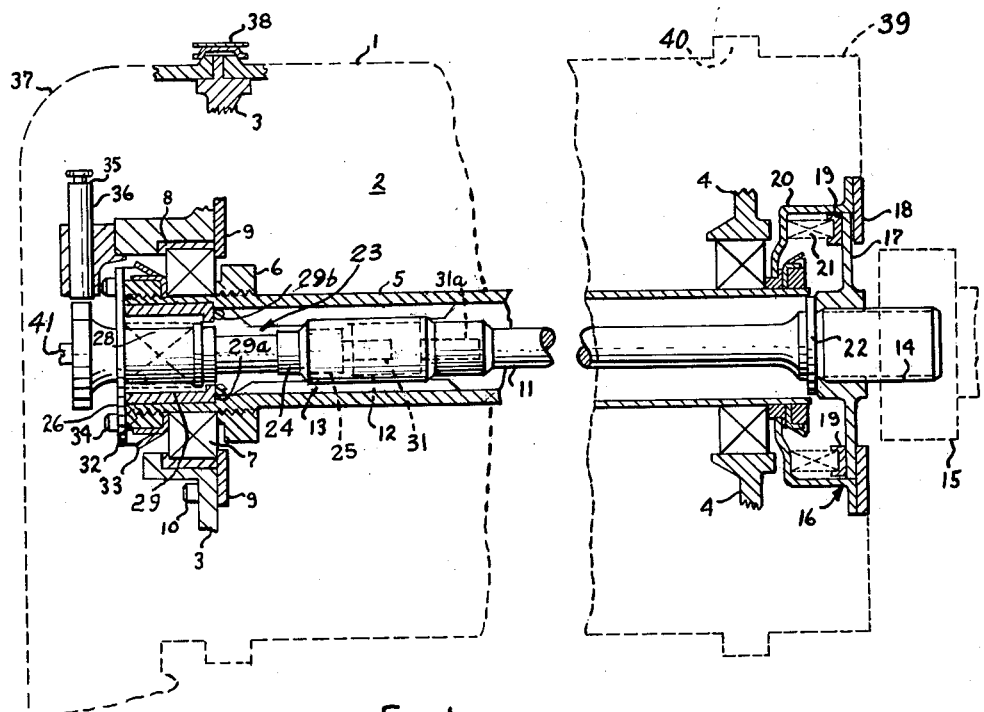
FIG. 1
INVENTORS
CHARLES F. RENNER
CLIFFORD F. TRAVIS
BY Vernon F. Kalb
ATTORNEY March 24, 1964 C. F. TRAVIS ETAL 3,126,080
COUPLING AND DECOUPING DRIVE UNIT
Filed Oct. 10, 1960 2 Sheets-Sheet 2

INVENTORS
CHARLES F. RENNER
BY CLIFFORD F. TRAVIS
BY Vernon F. Kalb
ATTORNEY

United States Patent Office 3,126,080
Patented Mar. 24, 1964

3,126,080
COUPLING AND DECOUPLING DRIVE UNIT
Clifford F. Travis and Charles F. Renner, Erie, Pa., assignors to General Electric Company, a corporation of New York
Filed Oct. 10, 1960, Ser. No. 61,776
5 Claims. (Cl. 192—94)

This invention relates to drive mechanism for an auxiliary drive unit with quick disconnect features, and more particularly relates to such a mechanism incorporated within the auxiliary unit. The invention is an improvement over the mechanism disclosed by Irving Kalikow in Patent 2,802,555, issued August 13, 1957, and assigned to the same assignee as the present application. This application is a continuation-in-part of our copending application, Serial No. 836,503, filed August 27, 1959, now abandoned.

The invention, which may find application wherever means are desired for effecting rapid and sure disconnection of an auxiliary driven machine from its driving means, is particularly adaptable for use in aircraft generators, and is described in that environment.

Among the requisites of all aircraft equipment are reliable operation, compact size, low weight, and accessibility for maintenance and inspection. In aircraft it may be required to disconnect a driven auxiliary unit such as a generator from its driving means for such reasons as generator faults, emergency need for all available engine power to keep the aircraft aloft, among others.

Accordingly, among the objects of this invention is the provision of a new and improved driving means for auxiliary units which is readily disconnectable from its driving means; which is incorporated in and forms part of the auxiliary unit; which does not add any appreciable weight or appreciably increase the dimensions of the auxiliary unit; which adds a minimum of additional parts to the auxiliary unit; and which is so constructed as to be readily accessible to effect rapid and easy reconnection of the driven shaft to the driving means without the necessity of the auxiliary unit being removed from its mount and without replacement or addition of parts or use of special tools.

Briefly stated, the invention in one form thereof provides in a dynamoelectric machine a hollow quill shaft having a rotor mounted thereon and journaled in the end walls of the machine, a drive or torque rod having splines at one end drivingly engaging splines on the interior of the quill shaft intermediate the ends thereof and the other end extending from the quill shaft for engagement with an adjacent drive means. Rotatively connected to the internal end of the torque rod is a disconnect device which extends a short distance beyond the outboard end of the quill shaft and has a blocking lip or tab thereon adapted to be engaged to halt rotation thereof. The disconnect device and torque rod are preferably threadably connected so that the torque rod advances axially upon the disconnect device when there is relative rotation between the two, to effect disconnection of the torque rod from the driving means. Upon rotation of the accessible end of the disconnect device, the torque rod is moved axially back into engagement with the driving means.

For a more complete understanding of the invention, which is defined with particularity in the appended claims, reference is now made to the following description taken in connection with the accompanying drawings in which:

FIGURE 1 is a view in elevation in section showing the component parts of a drive and mechanism disconnect incorporated within a generator;

FIGURE 2 is a view partially in section showing the torque rod and disconnect device;

FIGURE 3 is an end view of the disconnect shaft, illustrating in part a means for preventing rotation of the disconnect device.

Figure 4:
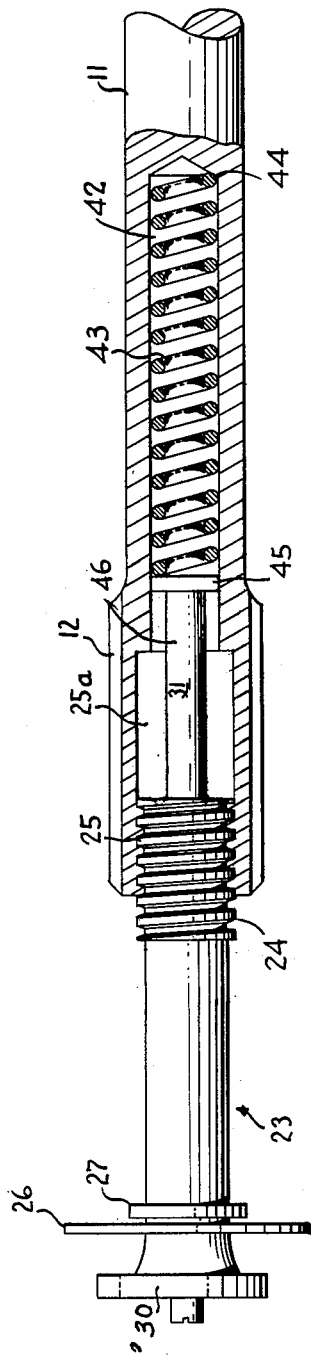
FIGURE 4 is a view partially in section showing a modified structure of the torque rod and disconnect device.

Referring now to the drawing wherein like reference characters designate like or corresponding parts throughout the view, there is shown a dynamoelectric machine such as a generator 1 having a housing 2 and end frame members 3 and 4, each being provided with openings for receiving a hollow quill shaft 5 adapted for rotation therein. The quill shaft supports a rotor, not shown, and is provided with a spacer member 6 for centering the shaft and holding anti-friction bearings 7 in end frame 3, affixed to the end of the housing 2. A second cylindrical spacer ring 8 engages the end shield 3 and outer race of bearing 7 for firmly supporting the bearing 7 in housing 2. Retaining ring 9 held in place by bolts 10 prevents lateral movement of bearing 7 inwardly of the housing.

A torque rod 11, which is flexible to a certain degree to withstand torsional stresses, is positioned concentrically within quill shaft 5 and is provided with axial splines 12 which engage axial splined grooves 13 on the inner peripheral surface of hollow quill shaft 5. The opposite end of the torque rod may be equipped with a similar set of splines 14 which normally extend beyond the drive end of quill shaft 5 and mesh with splined grooves, not shown, in a driving member or coupling device 15. The coupler 15 may be connected through a splined groove arrangement to an engine drive member, not shown, constructed and arranged for transmitting power from an engine through coupler 15 to the torque rod for driving the generator.

In order to prevent torsional vibration between the rod 11 and shaft 5 due to application of pulsating power to coupler 15, a torsional vibration dampening device 16 is provided, which includes a friction plate 17 mounted on splines 14, a backing plate 18 which prevents outward movement of the friction plate 17, pressure plates 19, a housing member 20 which is affixed to the quill shaft and backing plate 18, and resilient means such as springs 21 for biasing friction member 17 against backing plate 18. The vibration dampening springs 21 force pressure plates 19 against the friction plate 17, thereby tending to compress friction plate 17 between backing plate 18 and pressure plates 19. This arrangement tends to prevent relative movement of quill shaft 5 and torque rod 11, thereby damping out any torsional vibration. A limit plate 22 is provided on rod 11 to prevent longitudinal movement of the torque rod into the coupler. The limit plate 22 also serves as a stop when the torque rod is reconnected to the coupler after disconnection.

In accordance with our invention, the torque rod 11 is arranged to be disconnected from the coupling device 15 by axially retracting splines 14 from the splined grooves in the coupler 15. The splines 14 are so dimensioned with respect to the axial travel of rod 11, that upon disconnection from coupler 15, the travel of the torque rod splines 14, while sliding through the splined hub of friction plate 17, is insufficient to disconnect splines 14 from friction plate 17. Or otherwise stated, axial movement of torque rod 11, upon disconnection, is so limited that splines 14 and friction plate 17 remain engaged. In order to obtain disengagement of the torque rod from the coupler 15, a disconnect device or shaft 23 is provided which comprises take-up threads 24 which mate with threads 25 extending a portion of the distance within the splined portion 25a of rod 11. The threads 24 and 25 are so related that when the generator is being driven, there is no relative rotation between the disconnect shaft and the torque rod. However, when the disconnect shaft is prevented from rotating, the torque rod, being driven by coupler 15, will advance on the threads 24, thereby axially moving splines 14 from engagement with spline coupler 15, thus disconnecting the generator from its drive. The disconnect shaft assembly also includes a spring-retaining plate 26, a collar 27 on the disconnect shaft, and a spring 28 adapted to be placed in between the plate 26 and the collar 27. A bushing 29 is mounted within the outboard end of quill shaft 5 and retained against longitudinal movement therein by an internal shoulder 29a in shaft 5 and plate 26.

A cam-shaped member 30 with blocking lip or tab 30a thereon, which is illustrated as integral with the disconnect shaft, is accessible at the outboard end of the quill shaft 5. It is to be understood that the member 30 may be fabricated on or locked to the disconnect shaft. A guide 31 is provided to aid in the initially aligning of threads 24 and 25. When the torque rod is operative to drive the generator, the threads 24 are in engagement a partial dimension of their length with threads 25, and the plate 26 is secured to nut 32 which is threaded on the quill shaft. Locking tabs 33 formed on a ring member prevent the nut 32 from turning, due to rotation of the quill shaft. Bolts 34 secure the spring plate 26 to the nut 32.

The spring 28 biases collar 27 axially toward the torque rod 11, and in so doing increases the frictional engagement of threads 24 and 25 to protect against undesired relative rotation of torque rod 11 and shaft 23 due to vibration, inertia, etc., if such biasing is desired. This is accomplished by providing sufficient clearance between bushing 29 and collar 27.

The length of the threads are so dimensioned that upon axial movement of torque rod 11 to effect disengagement from coupler, threads 25 will overrun threads 24 to effect disengagement thereof. Threads 24 will then be positioned within non-threaded portion 25a of torque rod 11. The bushing 29 provides a surface upon which the torque rod 11 may bottom upon disconnection, and a resilient means such as an O-ring 29b may be so positioned as to absorb any shock due to the torque rod bottoming. The dimensions of the parts threads 24, 25, and portion 25a of the torque rod 11 are so chosen as to allow disengagement of the threads, closely followed by bottoming of torque rod on resilient member 29b while retaining splines 14 within the hub of friction plate 17.

A disconnect engaging pin 35, together with a pin guide 36, which may be mounted on end frame 3, is provided to engage tab 30a on cam member 30, thus preventing rotation of the disconnect shaft. It may be seen from FIG. 3 that engagement of the tab 30a by the pin 35 prevents rotation of the member 30 in the direction of the arrow. The mechanism for preventing rotation of the disconnect shaft is completely enclosed within air blast cap 37. The air blast cap, which may be connected to an air intake conduit, is removably secured to the end frames and housing by means of a channeled clamping band may be tensioned by means of a readily removable tensioning latch, not shown, to allow removal of the air blast cover.

The pin 35 may be caused to drop in the pin guide 36 and engage the tab 30a upon existence of a warning signal or upon command. For example, the pin 35 may be actuated by a solenoid, not shown, as explained in the aforementioned Kalikow patent, 2,802,555, which receives a signal from a bearing temperature-sensing device or from any other remote point or signaling device.

For aircraft generator operation, we provide a mounting adaptor 39 on the drive end of the generator which is adapted to be secured to a generator mounting pad associated with the driving shaft or coupler 15, not shown. The mounting adaptor may be secured to the housing 2 at point 40 in the same manner in which the air blast cap 37 is secured to housing 2. A preferred generator mounting arrangement is shown in Irving Kalikow Patent 2,645,438, issued July 14, 1953, and assigned to the same assignee as this application.

In operation, power is normally transmitted from the coupler 15 through torque rod 11 to quill shaft splines 13 intermediate the ends of quill shaft 5 to cause rotation of the quill shaft and operation of the generator. At this time pin 35 does not engage tab 30a, and the disconnect shaft rotates at the same speed as the torque rod. Assuming an emergency condition occurs, as for example, a bearing overheats, a bearing temperature-sensing device, not shown, transmits a signal to a solenoid, not shown, which causes pin 35 to be positioned to engage tab 30a to prevent disconnect shaft 23 from rotating, and the torque rod still being driven through coupler 15 is taken up on the threads 24, moving the splines 14 from engagement with the coupler 15, and hence disconnecting the generator from the prime mover. The take-up of torque rod 11 on the threads 24 may be very rapid, and torque rod 11 will bottom on resilient member 29b and bushing 29. At this time threads 25 have overrun threads 24 and guide 31 on shaft 23 has engaged slot 31a in torque rod 11 to aid in aligning the shaft 23 and torque rod 11. The splines 13 of quill shaft 5 are designed to be of sufficient axial length so that they remain in engagement with splines 12 of torque rod 11 upon disconnection of torque rod 11 from coupler 15, and thereby prevent relative rotation of the torque rod and quill shaft.

The structure of our mechanism allows easy and rapid reconnection of the torque rod to the coupler, which is a primary object and salient feature of the invention. To reconnect, the band 38 is removed, air blast cover 37 is then removed from the housing 2, and pin 35 is removed from engagement with tab 30. A pull is first exerted on the disconnect shaft in the outboard direction against tension of spring 28 to effect re-engagement of threads 24 and 25. The disconnect shaft is then rotated in the driven direction to axially move the torque rod 11 over threads 24, which results in the movement of splines 14 back into the spline-grooved coupling 15. To facilitate re-engagement of the spline 14 into the coupler 15, the splines are tapered at the edges thereof.

Assuming that the shaft has been disconnected on a multi-engine aircraft and it is desired to reconnect the shaft, the driving engine is stopped and the propeller feathered to prevent rotation. A crew member merely removes the air blast cover 37, pulls on disconnect shaft 23 to re-engage the threads 24 and 25, and then rotates shaft 23 in the appropriate direction, which may be accomplished through use of a screwdriver in slot 41 on the end of shaft 23.

Reference is now made to FIG. 4, which shows a modified torque rod and disconnect structure which may be incorporated in generator 1 of FIG. 1. In FIG. 4, like numerals to those of the other figures indicate like elements.

The torque rod 11 defines a longitudinal cavity 42 therein which receives a coil spring 43. The spring 43 is positioned between end 44 of cavity 42 and plate 45 on stem 46 which is part of disconnect shaft 23. The spring 43 increases the frictional engagement between the teeth of threads 24 and 25 to protect against undesired relative rotation of rod 11 and shaft 23. Disconnection of rod 11 of FIG. 4 is effected in substantially the same manner as previously explained for the mechanism of FIGS. 1 and 2. However, reconnection of the torque rod 11 of FIG. 4 to its driving means is accomplished here merely by rotation of member 30, inasmuch as spring 43 tends to push threads 24 back into engagements with threads 25 while plate 45 and stem 46 center the torque rod 11 and shaft 23.

The drive mechanism of FIG. 4 may be reconnected automatically from a remote point if means are provided to driveably engage the outboard end of shaft 23. For example, if the generator should be mounted in an inaccessible location, a spring motor or even a small electric motor could be made, from a remote point, to engage and rotate the shaft 23 if the additional equipment could be tolerated. The feature of remote connection would be advantageous in a driven unit embodying our invention in ground installations where access to the driven unit is limited or not readily accomplished.

We have provided a simple, compact drive mechanism which allows both disconnection and reconnection of a driven unit from a prime mover, and which is especially adapted for use with aircraft generators, although it is not our intention that our invention be limited to that environment. Modifications and variations of the disclosed embodiments of the invention are possible in light of the above teachings. One obvious modification would be to have an extension on the torque rod which would thread into the disconnect device. Accordingly, it is our intention to cover all changes and modifications of the examples of our invention herein chosen for purposes of disclosure which do not constitute departures from the spirit and scope of the invention.

What was claim as new and desire to secure by Letters Patent of the United States is:

1. In combination with a driven auxiliary unit including a rotatable assembly mounted and supported on a hollow driven shaft, apparatus operatively associated with said unit for coupling and decoupling an engine from said unit, comprising: a torque rod disposed concentrically within said hollow driven shaft and adapted for axial movement therein, said torque rod being adapted for engagement at one end with said engine and at the other end with said hollow driven shaft for driving said auxiliary unit, said torque rod further including an internally threaded region at said other end thereof; a disconnect shaft concentric with said hollow driven shaft and including thread means at one end normally partially engaging the internally threaded region of said torque rod and arranged to rotate in unison with said torque rod; and means adapted for selective engagement with said disconnect shaft operative when engaged to prevent rotation of said disconnect shaft so that said torque rod is caused to thread onto said disconnect shaft and to slide axially of said hollow driven shaft a sufficient distance to effect disengagement of said torque rod from said engine.

2. Apparatus incorporated within a driven auxiliary unit for coupling and decoupling an engine from said driven auxiliary unit comprising: a hollow driven shaft for supporting the rotative portion of said auxiliary unit; a torque rod disposed coaxially within said hollow driven shaft and adapted for axial movement therein, said torque rod being adapted for engagement at one end with said engine and at the other end with said hollow driven shaft for driving said auxiliary unit, said torque rod further including an internally threaded region at said other end; a disconnect shaft coaxial with said hollow driven shaft and including thread means at one end partially engaging the internally threaded region of said torque rod; means operatively associated with said torque rod and said disconnect shaft tending to maintain the initial partially threaded position of said torque rod and disconnect shaft and provide for rotation of said torque rod and disconnect shaft in unison; means adapted for selective engagement with the other end of said disconnect shaft operative when engaged to prevent rotation of said disconnect shaft so that said torque rod is threaded onto said disconnect shaft and caused to slide axially of said hollow driven shaft a sufficient distance to effect disengagement of said torque rod from said engine; and means for rotating said disconnect shaft to effect re-engagement of said torque rod with said engine.

3. A dynamoelectric machine adapted to be driven by a prime mover and having a driving mechanism operative to be disconnected and reconnected from the outboard end of said machine comprising: a hollow quill shaft having drive and outboard ends rotatively mounted in said dynamoelectric machine and axial splines on its inner periphery; a torque rod coaxial with said quill shaft having axial splines on one end thereof driveably engaging said quill shaft splines, said torque rod having a second end extending beyond said drive end of said quill shaft adapted to be driveably engaged by prime mover driven means, said torque rod being axially movable in said driven means and into said quill shaft a distance sufficient to effect disconnection thereof from the driven means, a disconnect shaft normally arranged to rotate in unison with said torque rod within said quill shaft in internal threadable engagement with said torque rod, said disconnect shaft being accessible at said outboard end of said quill shaft and being effective to cause axial movement of said torque rod upon relative rotation therebetween in a direction dependent on the rotative relation therebetween, means on the outboard end of said dynamoelectric machine for preventing rotation of said disconnect shaft whereby said torque rod is caused to threadably advance onto said disconnect shaft to effect disconnection from the driven means, rotation of said disconnect device in the appropriate direction after disconnection of said torque rod from the driven means causing axial movement of the torque rod toward the driven means to effect reconnection thereto.

4. A driven unit adapted to be driven by a prime mover and including a mechanism for transmitting torque from the prime mover to the driven unit comprising: a hollow quill shaft incorporated within said driven unit having drive and outboard ends and axial splines on its inner periphery intermediate the ends thereof; a torque rod coaxial with said hollow shaft having axial splines on one end thereof driveably engaging the internal splines of said quill shaft, said torque rod having a second end extending beyond the drive end of said quill shaft adapted to be driveably engaged by engine driven means to transmit torque to said quill shaft, said torque rod being axially movable in the driven means and into said quill shaft a distance sufficient to effect disconnection thereof from the driven means; a disconnect shaft normally arranged to rotate in unison with said torque rod within said quill shaft in internal threadable engagement with said one end of said torque rod whereby relative rotation between said disconnect shaft and said torque rod causes said torque rod to be threaded onto said disconnect shaft causing axial movement of said torque rod, said disconnect shaft having blocking means thereon accessible at the outboard end of said quill shaft; means for selectively engaging said blocking means to prevent rotation of said disconnect shaft to thereby cause the driven torque rod to advance axially onto said quill shaft and effect disconnection from the driven means, the axial spline engagement between said torque rod and said quill shaft being of sufficient length to remain in engagement upon disconnection of said torque rod from the driven means, said disconnect shaft being accessible to be rotated to axially move said torque rod toward the driven means to effect reconnection of said torque rod and said driven means.

5. In combination with a generator adapted to be mounted in an aircraft and driven by an engine of the aircraft, a mechanism for transmitting torque from the engine to the generator comprising: a hollow quill shaft incorporated within said generator having drive and outboard ends and axial splines on its inner periphery intermediate the ends thereof; a torque rod coaxial with said quill shaft having axial splines on one end thereof driveably engaging said internal quill shaft splines, said torque rod having a second end extending beyond the drive end of said quill shaft adapted to be driveably engaged by engine driven means to transmit torque to said quill shaft, said torque rod being axially moveable in said driven means and into said quill shaft a distance sufficient to effect disconnection thereof from the driven means; a disconnect shaft normally arranged to rotate in unison with said torque rod within said quill shaft in internal threadable engagement with said one end of said torque rod and having substantially no longitudinal movement whereby relative rotation between said disconnect shaft and said torque rod causes said torque rod to thread on to said disconnect shaft and cause axial movement of said torque rod, said disconnect shaft having blocking means thereon accessible at the outboard end of said quill shaft; means for engaging said blocking means to prevent rotation of said disconnect shaft to thereby cause the driven torque rod to advance axially onto said quill shaft and effect disconnection from the driven means, the axial spline engagement between said torque rod and said quill shaft being of sufficient length to remain in engagement upon disconnection of said torque rod from the driven means, said disconnect shaft being accessible to be rotated to axially move said torque rod toward the engine driven means to effect the reconnection of said torque rod therewith.

References Cited in the file of this patent

UNITED STATES PATENTS

| | | |
|---|---|---|
| 512,578 | Courtial | Jan. 9, 1894 |
| 876,053 | Heard | Jan. 7, 1908 |
| 1,510,226 | Howland | Sept. 30, 1924 |
| 1,943,321 | Hyland | Jan. 16, 1934 |
| 2,509,813 | Dineen | May 30, 1950 |
| 2,571,848 | Ehlers | Oct. 16, 1951 |
| 2,642,970 | Szekely | June 23, 1953 |
| 2,802,555 | Kalikow | Aug. 13, 1957 |

UNITED STATES PATENT OFFICE
CERTIFICATE OF CORRECTION

Patent No. 3,126,080            March 24, 1964

Clifford F. Travis et al.

It is hereby certified that error appears in the above numbered patent requiring correction and that the said Letters Patent should read as corrected below.

In the heading to the drawings, Sheets 1 and 2, line 2, for "COUPLING AND DECOUPING DRIVE UNIT", each occurrence, read -- COUPLING AND DECOUPLING DRIVE UNIT --.

Signed and sealed this 13th day of October 1964.

(SEAL)
Attest:

ERNEST W. SWIDER            EDWARD J. BRENNER
Attesting Officer            Commissioner of Patents